United States Patent [19]

Yamauchi et al.

[11] Patent Number: 4,934,009
[45] Date of Patent: Jun. 19, 1990

[54] STABILIZED AQUEOUS LIQUID COMPOSITION OF FIBER-REACTIVE AZO DYE: MIXTURE WITH VINYL-SULPHONYL AND BETA-SULPHATO ETHYL-SULPHONYL SUBSTITUENTS FOR LOW TEMPERATURE STABILITY

[75] Inventors: Noriaki Yamauchi, Hirakata; Yutaka Kayane, Ibaraki, both of Japan

[73] Assignee: Sumitomo Chemical Company, Limited, Osaka, Japan

[21] Appl. No.: 167,920

[22] Filed: Mar. 14, 1988

[30] Foreign Application Priority Data

Mar. 26, 1987 [JP] Japan .................. 62-73354

[51] Int. Cl.$^5$ .................. C09B 62/51; C09B 67/44; D06P 1/38
[52] U.S. Cl. .................. 8/527; 8/549; 8/639; 8/641; 8/684; 8/690; 8/692; 8/917; 8/918; 8/924
[58] Field of Search .................. 8/527, 639, 549, 641

[56] References Cited

U.S. PATENT DOCUMENTS

| | | | |
|---|---|---|---|
| 4,072,463 | 2/1978 | Schlafer et al. | 8/527 |
| 4,078,884 | 3/1978 | Opitz et al. | 8/527 |
| 4,118,184 | 10/1978 | Opitz et al. | 8/527 |
| 4,149,850 | 4/1979 | Schlafer et al. | 8/527 |
| 4,448,583 | 5/1984 | Corso | 8/527 |
| 4,482,350 | 11/1984 | Tokieda et al. | 8/524 |
| 4,749,380 | 6/1988 | Yamauchi et al. | 8/527 |

FOREIGN PATENT DOCUMENTS

54-131627 10/1979 Japan .

*Primary Examiner*—A. Lionel Clingman
*Attorney, Agent, or Firm*—Stevens, Davis, Miller & Mosher

[57] ABSTRACT

An aqueous liquid dye composition comprising 5 to 50% by weight of a mixture of at least one dye represented by the following formula (I),

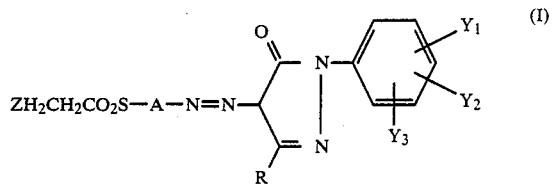

wherein A is a phenylene or naphthylene group unsubstituted or substituted by at least one member selected from methyl, methoxy, sulfo and carboxy, R is methyl or carboxy, $Y_1$, $Y_2$ and $Y_3$ independently of one another are each hydrogen, chloro, methyl or sulfo, and Z is a group splittable by the action of an alkali, and at least one dye represented by the following formula (II),

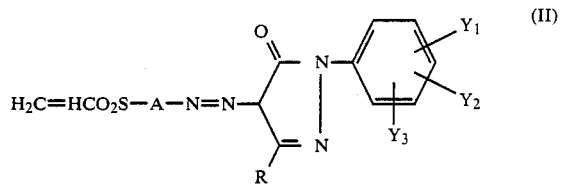

where A, R, $Y_1$ $Y_2$ and $Y_3$ are as defined above, which can be stored for a long period of time even at lower temperatures such as 5° C. or lower without crystallization of the dye.

6 Claims, No Drawings

STABILIZED AQUEOUS LIQUID COMPOSITION OF FIBER-REACTIVE AZO DYE: MIXTURE WITH VINYL-SULPHONYL AND BETA-SULPHATO ETHYL-SULPHONYL SUBSTITUENTS FOR LOW TEMPERATURE STABILITY

The present invention relates to an aqueous liquid composition of a fiber-reactive dye superior in storage stability, particularly at lower temperatures.

Fiber-reactive dyes represented by the following general formula (A),

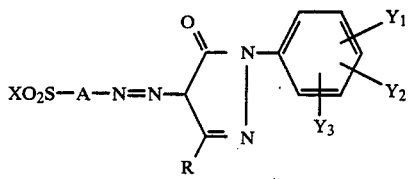

wherein A is a phenylene or naphthylene group unsubstituted or substituted by at least one member selected from methyl, methoxy, sulfo and carboxy, R is methyl or carboxy, X is $-CH=CH_2$ or $-CH_2CH_2Z$ in which Z is a group splittable by the action of an alkali, and $Y_1$, $Y_2$ and $Y_3$ independently of one another are each hydrogen, chloro, methyl or sulfo, have been extensively used for dyeing or printing fiber materials, particularly those such as cellullose fiber materials, because of their excellent dye characteristics.

Industrial dyeing and printing of fiber materials using fiber-reactive dyes have been carried out usually in an aqueous medium, and therefore, the fiber-reactive dyes commercially available in the form of powder or granule must be dissolved in the aqueous medium using hot water, when used for the dyeing or printing.

Recently, the dyeing and printing systems in dye houses have been extensively automated and mechanized, so that the fiber-reactive dyes have been increasingly required to be made into a suitable form for automatic weighing and dispensing systems.

Now, the fiber-reactive dyes in the form of an aqueous liquid composition are considered to be most favorable, because they cause no pollution of a working environment due to no powder-scattering on the handling, and require no dissolution process of the dye to serve energy and labor-saving improvements, and moreover they are suitable for the automatic weighing and dispensing systems in dye houses. Thus, it has been strongly required to obtain such aqueous liquid composition of the fiber-reactive dye without any problem from industrial point of view.

However, the commercial dye products in the form of aqueous liquid composition, through manufacture, custody, shipping, storage and the like, have to be exposed under lower temperature conditions such as 5° C. or lower during the winter months. Even when stable at ordinary temperatures, they are ease to deposit dye crystals because of decrease in the solubility of reactive dyes under such lower temperature conditions.

Once the crystallization of the dye occurs, the crystal-containing liquid composition can hardly be used as it is for the dyeing and printing, because of many troubles such as inaccuracy of the weighing, pipe-stopping of the automatic weighing and dispensing devices and the like.

On the other hand, in order to dissolve the dye crystals to obtain a uniform liquid dye composition in the former state, the crystal-containing dye composition must be heated up to about 80° C. This is very troublesome from operational point of view and from a high temperature-stability of the reactive dyes.

So far, increase in the solubility of the reactive dyes in the aqueous liquid compositions which are ease to deposit crystals of the dye under lower temperature conditions has been attempted by the addition of a hydrotropic agent as disclosed in Published Examined Japanese Patent Application No. 8369/1984, and by the demineralization treatment through a membrane as disclosed in Published Unexamined Japanese Patent Application No. 16522/1972.

However, in the preparation of the aqueous liquid composition using the reactive dyes represented by the above formula (A), the addition of the hydrotropic agent is not effective to expect the corresponding result, and the demineralization treatment through a membrane is inefficient and markedly expensive, particularly for the reactive dyes produced in a manner producing sodium sulfate as a by-product.

The present inventors have undertaken extensive studies to improve the low temperature-solubility of the above reactive dye (A) in a manner with industrial advantages, and as a result have found a fact that a mixture of respective dyes having as X in the above formula (A) $-CH=CH_2$ and $-CH_2CH_2Z$ in which Z s as defined above, can meet such needs.

The present invention provides an aqueous liquid dye composition containing 5 to 50% by weight of a mixture of at least one dye of the following formula (I),

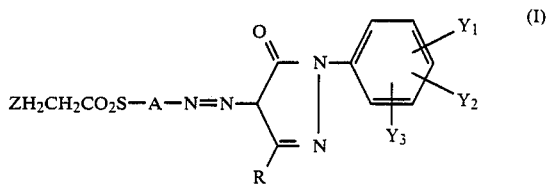

wherein A, R, $Y_1$, $Y_2$, $Y_3$ and Z are as defined above [hereinafter referred to as the dye (I)], and at least one dye of the following formula (II),

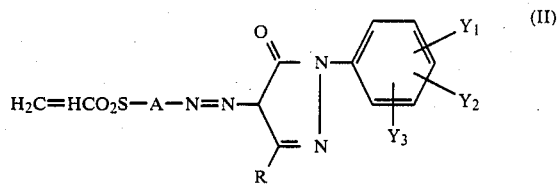

wherein A, R, $Y_1$, $Y_2$ and $Y_3$ are as defined above [hereinafter referred to as the dye (II)].

In the above formula (I), the group splittable by the action of an alkali, which is represented by Z, includes, for example, sulfuric acid ester, thiosulfuric acid ester, phosphoric acid ester and acetic acid ester groups and halogen atoms. Of these, preferred is the sulfuric acid ester group.

The mixing weight ratio of the dye (I) : the dye (II) is preferably from 95:5 to 50:50, more preferably from 90:10 to 60:40.

Both the dye (I) and the dye (II) are already known and can be readily produced by coupling a diazonium salt of the corresponding amine component with the corresponding coupling component.

The aqueous liquid dye composition of the present invention can be produced by mixing both aqueous solutions containing the dye (I) and the dye (II), respectively. However, the present liquid dye composition can be produced industrially advantageously by subjecting an aqueous solution containing the dye (I) to alkali treatment.

In the preparation of the aqueous dye (I)-containing solution, a dye (I)-containing reaction mixture obtainable through a conventional production process of the dye can be used as it is. Alternatively, a wet cake obtainable by salting out the dye (I)-containing reaction mixture, followed by filtration, or a powder obtainable by drying the wet cake, followed by pulverization, can be used by dissolving it in water. When the dye (I)-containing reaction mixture having a water content higher than that desired is used, the water content can be controlled by subjecting the reaction mixture to concentration, such as, for example, evaporation of water in vacuo, or by mixing the reaction mixture with the wet cake or the powder described aboved. The thus prepared aqueous dye (I)-containing solution is then subjected to alkali treatment, thereby converting a part of the dye (I) to the dye (II) (vinyl-formation).

The alkali treatment can be carried out by mixing the aqueous dye (I)-containing solution with an alkali such as alkali metal hydroxides and carbonates including sodium carbonate and sodium hydrogencarbonate, and then treating the resulting mixture at a temperature of about 40° to about 60° C. for about 1 to about 5 hours. The amount of the alkali corresponds to the chemical equivalent of the dye (II) to be formed.

The mixing ratio between the dye (I) and the dye (II) in the aqueous liquid dye composition can be readily controlled by the amount of the alkali to be used and the temperature and time in the alkali treatment. The discontinuation of the vinyl formation reaction can be effected in a manner such that the pH of the dye solution is controlled within 3 to 7 by adding a suitable amount of an acid such as diluted sulfuric acid, acetic acid and the like, and the solution temperature is lowered to ordinary temperatures.

When the thus obtained aqueous liquid dye composition of the present invention is contaminated with sodium sulfate, the content thereof may be controlled preferably to 2.5% by weight or less, more preferably to 2% by weight or less.

The sodium sulfate content can be controlled by a reverse osmotic demineralization, electrodialysis or cooling method taking advantage of the difference in solubility. In the present invention, the cooling method is preferably applied therefor in a manner such that the aqueous liquid dye composition obtained is cooled to a temperature of −10° to 5° C. and kept at this temperature for 1 to 10 hours, and then the crystallized inorganic salts including sodium sulfate are separated by filtration.

The aqueous liquid dye composition is preferably controlled within a pH of 3 to 7 using a mineral acid or alkali. If desired, a pH buffer such as carboxylic acid type and phosphoric acid type buffers, and a surfactant may be incorporated in the aqueous liquid dye composition.

The aqueous liquid dye composition in accordance with the present invention is improved in the solubility, so that it can be stored for a long period of time even at low temperatures such as 5° C. or lower. For example, it can be stored for 2 months at 5° C. without crystallization of the reactive dye.

Moreover, surprising is the fact that the aqueous liquid dye composition of the present invention is also superior in storage stability at high temperatures such as 40° C. or higher, though it contains a relatively large amount of the vinylsulfonyl group-carrying dye (II).

It is advantageous from industrial viewpoint that the present aqueous liquid dye composition having low viscosities such as 10 cps or less can be kept unchanged for a long period of time, and therefore can be applied for various automatic weighing and dispensing systems even after a long period storage.

In the dyeing or printing of fiber materials such as natural and regenerated cellulose fibers, wool, silk, synthetic polyamide and the like, the aqueous liquid dye composition in accordance with the present invention can exhibit dyeability approximately equal to that of conventional powdery products.

The present invention is illustrated in more detail with reference to the following Examples, which are only illustrative. In the Examples, parts and % are by weight.

EXAMPLE 1

Sodium carbonate in an amount of 69 g/l was added to and dissolved in a reaction mixture prepared in a known manner, the mixture being an aqueous dye solution containing 26% of a dye represented by the following formula (1) in the free acid form, $Q_1$ or (1)

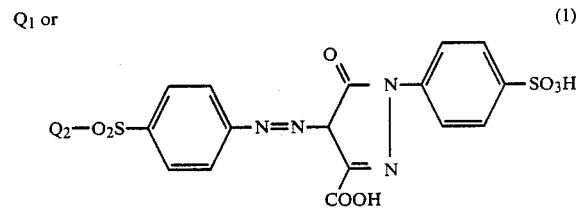

in the weight ratio of the dye having $-CH=CH_2$ as $Q_1$ (the dye $Q_1$) : the dye having $-C_2H_4OSO_3H$ as $Q_2$ (the dye $Q_2$) being 1:99, 0.5% of sodium chloride and 8.5% of sodium sulfate.

The resulting mixture was kept at 55° to 60° C. for 2 hours. Thereafter, the mixture was cooled to 20° C. and then adjusted to pH 5.0 using 10% sulfuric acid. Successively, the mixture was cooled to 5° C. and kept at that temperature for about 5 hours to precipitate inorganic salts, which were then separated by filtration.

The thus obtained dye solution (950 parts) having the mixing ratio of 30:70 in the dye $Q_1$ : the dye $Q_2$, 0.2% in a sodium chloride content, 1.0% in a sodium sulfate content and 5.0 in the pH value, was mixed with water (50 parts) to obtain an aqueous liquid dye composition.

EXAMPLES 2 to 4

Sodium carbonate in an amount of 8.8 g/ was added to and dissolved in a reaction mixture prepared in a known manner, the mixture being an aqueous dye solution containing 26% of the dye of the formula (1) in the mixing ratio of the dye $Q_1$ : the dye $Q_2$ being 3:97, 0.5% of sodium chloride and 8.5% of sodium sulfate.

The resulting mixture was kept at 55° to 60° for 2 hours. Thereafter, the mixture was cooled to 20° C. and then adjusted to pH 4.5 using 10% sulfuric acid. After completion of this vinyl formation reaction, the mixing ratio of the dye $Q_1$ : the dye $Q_2$ was found to be 40:60.

The respective reaction mixtures unsubjected and subjected to vinyl formation reaction described above were mixed with each other to obtain each dye solution of the $Q_1:Q_2$ mixing ratio as shown below in Table I.

Successively, the dye solution was kept at 0° C. for about 5 hours to precipitate inorganic salts, which were then separated by filtration. The resulting dye solution was mixed with water to obtain an aqueous liquid dye composition having a dye content as shown in the Table.

Each aqueous liquid dye composition was stored under conditions described therein, and neither crystallization of the dye nor change in the liquid state was observed after storage even at low and high temperatures, respectively.

TABLE I

| Example No. | Mixing ratio ($Q_1:Q_2$) | Dye content (%) | Sodium chloride content (%) | Sodium surfate content (%) | pH | Conditions of storage |
| --- | --- | --- | --- | --- | --- | --- |
| 2 | 8:92 | 25 | 0.3 | 1.0 | 5.5 | 5° C. × 4 weeks 40° C. × 8 weeks |
| 3 | 15:85 | 25 | 0.3 | 1.3 | 5.3 | 0° C. × 4 weeks 40° C. × 8 weeks |
| 4 | 35:65 | 25 | 0.3 | 1.2 | 4.5 | 0° C. × 8 weeks 40° C. × 8 weeks |

EXAMPLE 5

Sodium carbonate in an amount of 5.8 g/l was added to and dissolved in a reaction mixture prepared in a known manner, the reaction mixture being an aqueous dye solution containing 27% of a dye represented by the following formula (2) in the free acid form, $Q_3$ or  (2)

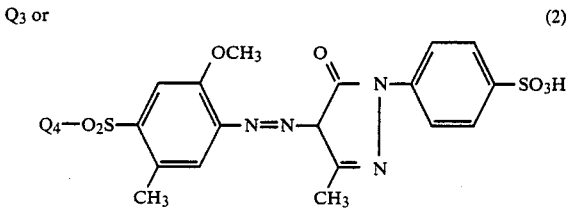

in the weight ratio of the dye having —CH=CH$_2$ as $Q_3$ : the dye having —C$_2$H$_4$OSO$_3$H as $Q_4$ being 2:98, 0.4% of sodium chloride and 6.0% of sodium sulfate.

The resulting mixture was kept at 55° to 60° C. for 3 hours. Thereafter, the mixture was cooled to 20° C. and then adjusted to pH 4.8 using 10% sulfuric acid. Successively, the mixture was cooled to 0° C. and kept at that temperature for about 5 hours to precipitate inorganic salts, which were then separated by filtration.

The thus obtained dye solution (930 parts) having 30:70 in the $Q_3:Q_4$ mixing ratio, 0.3% in a sodium chloride content, 1.5% in a sodium sulfate content and 4.8 in the pH value, was mixed with water (70 parts) to obtain an aqueous liquid dye composition.

A part of the liquid dye composition was stored at 5° C. for 8 weeks. Thereafter, no crystallization of the dye was observed and the state of solution was kept unchanged.

Another part of the liquid dye composition was stored at 40° C. for 8 weeks. Thereafter, the dye composition was used for the dyeing in a conventional manner to obtain a dyed product of a color depth and a shade equal to that obtained using a conventional powdery dye product.

EXAMPLE 6

Sodium carbonate in an amount of 1.2 g/l was added to and dissolved in a reaction mixture prepared in a known manner, the reaction mixture being an aqueous dye solution containing 27% of a dye represented by the following formula (3) in the free acid form, $Q_5$ or  (3)

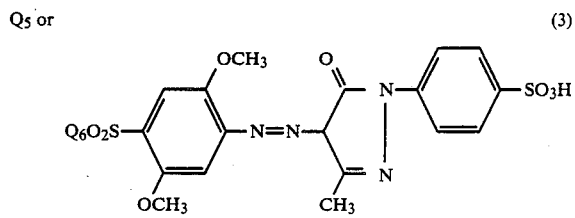

in the weight ratio of the dye having —CH=CH$_2$ as $Q_5$ : the dye having —C$_2$H$_4$OSO$_3$H as $Q_6$ being 2:98, 0.4% of sodium chloride and 7.5% of sodium sulfate.

The resulting mixture was kept at 55° to 60° C. for 1 hour. Thereafter, the mixture was cooled to 20° C. and then adjusted to pH 5.1 using 10% sulfuric acid. Successively, the mixture was cooled to 0° C. and kept at that temperature for about 5 hours to precipitate inorganic salts, which were then separated by filtration.

The thus obtained dye solution (980 parts) having 7:93 in the $Q_5:Q_6$ mixing ratio, 0.3% in a sodium chloride content, 2.0% in a sodium sulfate content and 5.1 in the pH value, was mixed with water (20 parts) to obtain an aqueous liquid dye solution.

A part of the liquid dye composition was stored at 0° C. for 8 weeks. Thereafter, no crystallization of the dye was observed, and the state of solution was kept unchanged.

Another part of the liquid dye composition was stored at 60° C. for 2 weeks. Thereafter, the dye composition was used for the dyeing in a conventional manner to obtain a dyed product of a color depth and a shade equal to that obtained using a conventional powdery dye product.

We claim:

1. An aqueous liquid dye composition comprising 5 to 50% by weight of a mixture of at least one dye represented by the following formula (I)

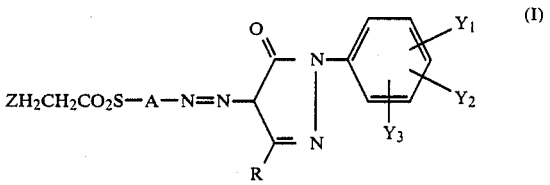

wherein A is a phenylene or naphthylene group unsubstituted or substituted by at least one member selected from methyl, methoxy, sulfo and carboxy, R is methyl or carboxy, $Y_1$, $Y_2$ and $Y_3$ independently of one another are each hydrogen, chloro, methyl or sulfo, and Z is a group splittable by the action of an alkali, and at least one dye represented by the following formula (II),

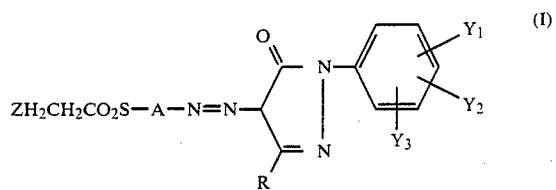

wherein A is a phenylene or naphthylene group unsubstituted or substituted by at least one member selected from methyl, methoxy, sulfo and carboxy, R is a methyl or carboxy group, $Y_1$, $Y_2$ and $Y_3$ independently of one another are each hydrogen, chloro, methyl or sulfo, and Z is a group splittable by the action of an alkali, which comprises mixing the liquid dye solution with an alkali, keeping the mixture at a temperature of about 40° to about 60° C. to form an aqueous liquid dye composition comprising the dye of the formula (I) and a dye represented by the following formula (II)

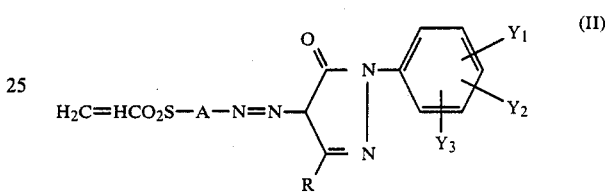

wherein A, R, $Y_1$, $Y_2$ and $Y_3$ are as defined above in a weight ration of 95:5 to 50:50, adjusting the aqueous liquid dye composition within a pH of 3 to 7, wherein the dyes of the formulas (I) and (II) having been produced by a conventional production process which produces an inorganic salt as a byproduct.

* * * * *

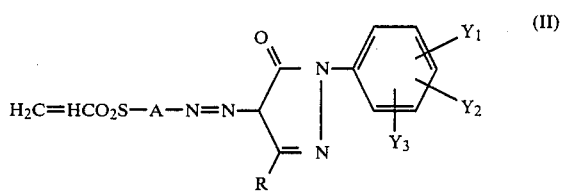

wherein A, R, $Y_1$, $Y_2$, and $Y_3$ are as defined above, the mixing weight ratio of the dye of the formula (I) to the dye of the formula (II) being from 95:5 to 50:50, the pH of the composition ranging from 3 to 7, wherein the dyes of the formulas (I) and (II) having been produced by a conventional production process which produces an inorganic salt as a byproduct.

2. An aqueous liquid dye composition according to claim 1, wherein the ratio is from 90:10 to 60:40.

3. An aqueous liquid dye composition according to claim 1, wherein the dye of the formula (I) has sulfato (—OSO$_3$H) as Z.

4. An aqueous liquid dye composition according to claim 1, wherein the composition additionally comprises a pH buffer or a surfactant.

5. An aqueous liquid dye composition according to claim 1, wherein the composition comprises sodium sulfate in an amount of 2.5% by weight or less.

6. A process for stabilizing an aqueous liquid dye solution containing a dye represented by the following formula (I),